United States Patent
Weber et al.

(10) Patent No.: US 11,933,689 B2
(45) Date of Patent: Mar. 19, 2024

(54) MEMS CAPACITIVE SENSOR INCLUDING IMPROVED CONTACT SEPARATION

(71) Applicant: Robert Bosch GmbH, Stuttgart (DE)

(72) Inventors: Heribert Weber, Nuertingen (DE); Christoph Hermes, Kirchentellinsfurt (DE); Hans Artmann, Boeblingen-Dagersheim (DE); Peter Schmollngruber, Aidlingen (DE); Thomas Friedrich, Moessingen-Oeschingen (DE); Volkmar Senz, Metzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 245 days.

(21) Appl. No.: 17/420,953

(22) PCT Filed: Mar. 26, 2020

(86) PCT No.: PCT/EP2020/058541
§ 371 (c)(1),
(2) Date: Jul. 6, 2021

(87) PCT Pub. No.: WO2020/207810
PCT Pub. Date: Oct. 15, 2020

(65) Prior Publication Data
US 2022/0090975 A1    Mar. 24, 2022

(30) Foreign Application Priority Data
Apr. 12, 2019  (DE) .......................... 102019205346.7

(51) Int. Cl.
*G01L 9/12*     (2006.01)
*G01L 19/00*    (2006.01)
*G01L 19/06*    (2006.01)

(52) U.S. Cl.
CPC ............ *G01L 9/12* (2013.01); *G01L 19/0061* (2013.01); *G01L 19/0618* (2013.01)

(58) Field of Classification Search
None
See application file for complete search history.

(56) References Cited

U.S. PATENT DOCUMENTS

| 9,518,877 | B2 * | 12/2016 | Weber | ................... | B81B 3/007 |
| 2015/0276512 | A1 * | 10/2015 | Zhang | ................... | G01L 9/0047 |
| | | | | | 216/33 |
| 2018/0335358 | A1 * | 11/2018 | Zheng | ................... | B81B 7/0029 |

FOREIGN PATENT DOCUMENTS

| DE | 102006055147 A1 | 5/2008 |
| DE | 102013213065 A1 | 1/2015 |

(Continued)

OTHER PUBLICATIONS

International Search Report for PCT/EP2020/058541, dated Jul. 20, 2020.

*Primary Examiner* — Brandi N Hopkins
*Assistant Examiner* — Nigel H Plumb
(74) *Attorney, Agent, or Firm* — NORTON ROSE FULBRIGHT US LLP; Gerard A. Messina

(57) ABSTRACT

A sensor device having a first counter electrode extending under an intermediate carrier, and having a first distance between the intermediate carrier and the first counter electrode being modifiable by the pressure on the movable region, and the first counter electrode encompassing, under the intermediate carrier, at least one electrically separated region that is disposed below a spacing element and includes at least a lateral extent of the spacing element.

15 Claims, 6 Drawing Sheets

(56) References Cited

FOREIGN PATENT DOCUMENTS

| | | | |
|---|---|---|---|
| DE | 102014101700 A1 | 8/2015 | |
| EP | 2873958 A1 | 5/2015 | |

\* cited by examiner

MEMS CAPACITIVE SENSOR INCLUDING IMPROVED CONTACT SEPARATION

FIELD

The present invention relates to a sensor device and to a method for producing a sensor device.

BACKGROUND INFORMATION

Capacitive pressure sensors can usually be produced by depositing conductive layers and sacrificial layers, as well as a membrane layer that can be subsequently disengageable. In most cases the thickness of the sacrificial layer defines the distance of a movable electrode away from a stationary counter electrode. In order to increase the sensitivity of a membrane sensor of this kind, a small distance between the movable electrode and counter electrode is desirable; ideally, it can be configured to be plane-parallel.

In order to allow mechanical and electrical contact between the movable electrode and counter electrode to be prevented, spacing elements, which are made of the electrode material and can be embodied as knobs, are usually disposed on an electrode structure. For the case in which the electrodes are not electrically contacted, direct contact between the knobs and a counter electrode as a rule is not critical. The same also applies to the case in which direct contact occurs between knobs and an electrode in a context in which the knobs and the electrode are at the same electrical potential. Only in the case in which the electrical potential at the knobs and at the electrode contacted by the knobs is different can a short circuit, and welding of the knob materials and electrode materials, occur.

German Patent Application No. DE 10 2006 055 147 describes knobs on which a layer of, for instance, silicon nitride (Si3N4), silicon oxynitride (SixOyNz), or a silicide such as tungsten silicide (WSi) can additionally be present.

German Patent Application No. DE 10 2013 213 065 describes a capacitive pressure sensor that can encompass a counter electrode on a substrate, such that a sacrificial layer having cavities can be deposited on the counter electrode, and a membrane can be disposed on the sacrificial layer. Etching accesses in the membrane can be disposed alongside the counter electrode, and the cavities can also be usable as etching conduits. Thin membranes can be achieved in this manner.

SUMMARY

The present invention provides a sensor device, and a method for producing a sensor device.

Preferred refinements of the present invention are disclosed herein.

In accordance with an example embodiment of the present invention, a sensor device and a method for producing it are provided, the sensor device being notable for the fact that spacing elements can be configured between a membrane-stiffening intermediate carrier, which represents a movable electrode, and a substrate having a counter electrode electrically insulated with respect to the substrate; the spacing elements can rest on the layer electrically insulating the counter electrode from the substrate or on a region that is electrically insulated with respect to the counter electrode and has the same potential as the membrane. With such spacing elements, contact between the counter electrode and the intermediate carrier that reinforces the membrane, and electrical short circuiting and welding of knobs to corresponding abutment surfaces, can be avoided.

According to an example embodiment of the present invention, the sensor device encompasses: a substrate; at least one electrical insulation layer on the substrate; an edge structure that is disposed on the at least one electrical insulation layer and delimits an internal region above the substrate; a membrane that is anchored on the edge structure and at least partly spans the internal region, the membrane encompassing in the internal region a region movable by a pressure; a first intermediate carrier that extends in the movable region below the membrane and is electrically and mechanically connected to the membrane by contact points, and encompasses at least one spacing element that extends from the intermediate carrier toward the substrate; and a first counter electrode on the at least one electrical insulation layer, the first counter electrode extending under the intermediate carrier, and a first distance between the intermediate carrier and the first counter electrode being modifiable by the pressure on the movable region, and the first counter electrode encompassing, under the intermediate carrier, at least one electrically separated region that is disposed below the spacing element and has at least a lateral extent of the spacing element.

Alternatively or optionally, the first counter electrode is patterned into at least two elements, the corresponding elements of the counter electrode being disposed in spaced fashion on the at least one electrical insulation layer. This spacing generates a region below the spacing element, and has a lateral extent that corresponds at least to the lateral extent of the spacing element.

The separated region can be laterally not, partly, or completely surrounded by the remaining regions of the counter electrode.

The movable electrode represents, with the first counter electrode on the substrate, a modifiable capacitance. The sensor device can be configured as a micromechanical capacitive sensor, advantageously as a pressure sensor.

In accordance with a preferred embodiment of the sensor device of the present invention, the first counter electrode encompasses in the separated region at least one recess having a floor, in which the electrical insulation layer is exposed and which is electrically insulated from the first counter electrode, the recess being located below the spacing element and extending, in plan view, laterally beyond the spacing element in all directions.

In accordance with a preferred embodiment of the sensor device of the present invention, the spacing element encompasses a material identical to that of the intermediate carrier.

In accordance with a preferred embodiment of the sensor device of the present invention, the spacing element has a first height that is greater than a thickness of the first counter electrode.

Alternatively, however, the height of the spacing element can be selected as desired. The height of the spacing element can be less than the thickness of the sacrificial layer (upon production) or less than the sum of the sacrificial layer thicknesses. The height of the spacing element can be less than the thickness of the counter electrode, or less than the total thickness of the third and fourth sacrificial layers.

In accordance with a preferred embodiment of the sensor device of the present invention, the region electrically separated from the first counter electrode, and the first counter electrode, encompass one identical material, the electrical potential present at the separated region being the same as that at the first intermediate carrier.

In accordance with a preferred embodiment of the sensor device of the present invention, the spacing element has a first height that is less than a thickness of the first counter electrode.

In accordance with a preferred embodiment of the sensor device of the present invention, the spacing element has a first height that is less than the first distance between the intermediate carrier and the first counter electrode in an idle position of the intermediate carrier.

If a pressure that is less than the surrounding atmospheric pressure is enclosed in the internal region below the membrane in the context of production, then after production of the sensor device the membrane can already possess a first deflection and the intermediate carrier can be at a first distance from the first counter electrode. The position thereby assumed by the intermediate carrier can be understood as an "idle position" of the intermediate carrier.

In accordance with a preferred embodiment of the sensor device of the present invention, the material of the first counter electrode is deposited on an insulation layer that is etch-resistant with respect to hydrogen fluoride (HF) vapor and HF in liquid form.

According to an example embodiment of the present invention, in the method for producing a sensor device: a substrate having at least one electrical insulation layer is furnished and an electrically conductive layer is disposed on the electrical insulation layer on the substrate; the electrically conductive layer is patterned into a first counter electrode in an internal region and the first counter electrode is patterned, at least one region electrically separated from the first counter electrode being configured in the internal region. In addition, a first intermediate carrier is disposed at a first distance above the first counter electrode using at least one spacing element that extends away from the intermediate carrier toward the substrate, so that the spacing element is located above the separated region and is spaced away from it; an edge structure being configured on the electrical insulation layer and a membrane being anchored on the edge structure and at least partly spanning the internal region; the membrane encompassing in the internal region a region movable by a pressure; and the first intermediate carrier extending in the movable region below the membrane and being electrically and mechanically connected to the membrane by contact points; and the spacing element having a lateral extent that is the same as or less than the extent of the separated region.

The method can advantageously also be notable for the features and their advantages already recited in conjunction with the sensor device, and vice versa.

In accordance with a preferred embodiment of the method of the present invention, an electrical insulation layer is disposed on the substrate, advantageously before an electrically conductive layer is disposed.

In accordance with a preferred embodiment of the method of the present invention, upon patterning of the first counter electrode, a first recess is introduced into the at least one region electrically separated from the first counter electrode, in which recess the material of the first counter electrode is removed and advantageously the electrical insulation layer, on which the material of the first counter electrode has been deposited, is exposed.

In accordance with a preferred embodiment of the method of the present invention, before disposition of the first intermediate carrier, a third sacrificial layer is disposed on the first counter electrode and on the first recess and is removed again in a third sub-region of the first recess, so that edges of the first counter electrode in the first recess remain covered by the first sacrificial layer.

In accordance with a preferred embodiment of the method of the present invention, a fourth sacrificial layer is disposed onto the third sacrificial layer and in the third sub-region, and inside the third sub-region in a fourth sub-region a recess is configured whose lateral dimensions are smaller than those of the third sub-region, a remaining thickness of the fourth sacrificial layer defining, in the recess, a distance of the spacing element from a floor of the separated region.

In accordance with a preferred embodiment of the method of the present invention, before disposition of the first intermediate carrier, a third sacrificial layer is disposed on the first counter electrode and on the region electrically separated from the counter electrode, and is removed again above the separated region in a third sub-region that has a smaller lateral extent than the separated region.

In accordance with a preferred embodiment of the method of the present invention, a fourth sacrificial layer is disposed onto the third sacrificial layer and in the third sub-region, advantageously on the region separated from the counter electrode, and inside the third sub-region in a fourth sub-region a recess is configured whose lateral dimensions are smaller than those of the third sub-region, a remaining thickness of the fourth sacrificial layer in the recess in the fourth sub-region defining a distance of the spacing element from the surface of the separated region.

In accordance with a preferred embodiment of the method of the present invention, a fourth sacrificial layer is disposed onto the third sacrificial layer and in the third sub-region, and inside the third subregion in a fourth subregion a recess is configured in the fourth sacrificial layer, the thickness of which defines a distance of the spacing element from a floor of the separated region.

In accordance with a preferred embodiment of the method of the present invention, the fourth sacrificial layer and/or the third sacrificial layer are partly or completely removed inside the third and/or fourth sub-region by an etching operation.

In accordance with a preferred embodiment of the method of the present invention, the respective contact point is disposed vertically above the spacing element.

In accordance with a preferred embodiment of the method of the present invention, the first conductive layer is patterned in such a way that the separated region is configured by way of a trench in the electrically conductive layer, and is electrically separated from a remaining region of the first counter electrode. The trench can completely laterally surround the separated region.

Further features and advantages of embodiments of the present invention are evident from the description below with reference to the figures.

BRIEF DESCRIPTION OF THE DRAWINGS

The present invention will be explained in further detail below on the basis of the exemplifying embodiment shown in the schematic Figures.

In the Figures, identical reference characters refer to identical or functionally identical elements.

DETAILED DESCRIPTION OF EXAMPLE EMBODIMENTS

Figure 1:
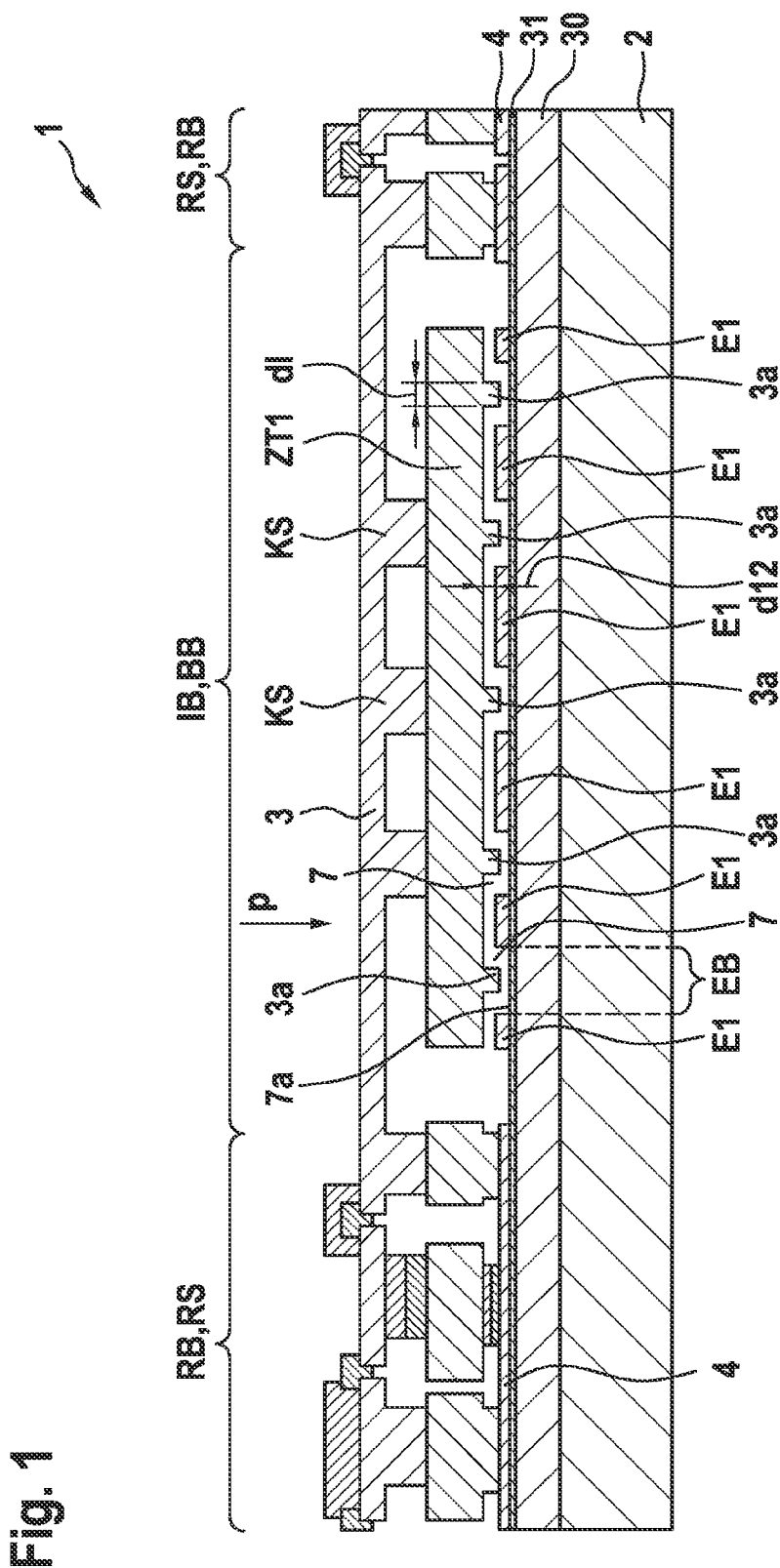
FIG. 1 is a schematic side view of a sensor device in accordance with an exemplifying embodiment of the present invention.

FIG. 1 is a schematic side view of a sensor device in accordance with an exemplifying embodiment of the present invention.

A sensor device 1 encompasses: a substrate 2, and can encompass an electrical insulation plane which is continuous with full coverage except for a few openings for creating electrical contacts to the substrate and which can be made up of several electrical insulation layers 30 and/or 31; an edge structure RS that is disposed on electrical insulation layers 30 and/or 31 on substrate 2 and delimits an internal region IB above substrate 2; a membrane 3 that is anchored on edge structure RS and at least partly spans internal region IB, membrane 3 encompassing in internal region IB a region BB movable by a pressure; a first intermediate carrier ZT1 that extends in movable region BB below membrane 3 and represents a movable electrode that is electrically and mechanically connected to membrane 3 by contact points KS and encompasses at least one spacing element 3a that extends toward substrate 2 from first intermediate carrier ZT1; and a first counter electrode E1, on substrate 2 and on insulation layer 30 and/or 31, which extends below first intermediate carrier ZT1.

A first distance d12 between first intermediate carrier ZT1 and first counter electrode E1 is modifiable by application of a pressure p onto movable region BB, first counter electrode E1 under first intermediate carrier ZT1 encompassing at least one region EB which is separated electrically (laterally from the remaining regions of first counter electrode E1), which is disposed below spacing element 3a and has at least a lateral extent of spacing element 3a.

Alternatively or optionally, first counter electrode E1 is patterned into at least two elements, the corresponding elements of counter electrode E1 being disposed in distanced fashion on the at least one electrical insulation layer 30 and/or 31. This spacing generates a region EB below spacing element 3a which has a lateral extent that corresponds at least to the lateral extent of spacing element 3a. Provision can be made in particular that the at least two elements of counter electrode E1 are connected to one another by way of an electrical connection.

A first, electrically nonconductive, insulation layer 30, on which in turn a first electrically conductive layer 4 can constitute first counter electrode E1 in FIG. 1, can be disposed on substrate 2. It is furthermore possible for an additional insulation layer, advantageously an electrically nonconductive layer 31, which can also encompass several individual layers and can possess a maximum etching resistance to hydrogen fluoride (HF) in both liquid and gaseous form, to be capable of being provided between first insulation layer 30 and first conductive layer 4, or instead of first insulation layer 30. Substrate 2 can furthermore encompass silicon; first insulation layer 30 can encompass a silicon oxide and/or a stoichiometric silicon nitride layer; and additional insulation layer 31 can encompass a silicon-rich nitride layer, a silicon carbide layer, or an aluminum oxide layer.

First counter electrode E1 can encompass in separated region EB at least one recess 7 (EB in FIG. 1) having a floor 7a which can be electrically insulated from first counter electrode E1 and in which first insulation layer 30 or additional insulation layer 31 can be exposed. Recess 7 is located below spacing element 3a and can extend, in a plan view, laterally beyond spacing element 3a in all directions. The patterning of first conductive layer 4, i.e. the constitution of first counter electrode E1, can advantageously be accomplished in a single step both for separated regions EB and for the separation into a first counter electrode E1 and one or several second counter electrodes.

Spacing elements 3a can advantageously prevent two oppositely located conductive structures having different potentials from coming into contact, and thus possibly causing a short circuit and spot-welding of the structures. In the examples shown, conductive layer 4 and/or intermediate carrier ZT1 and/or membrane 3 can encompass, for example, n- or p-doped polysilicon; doping of polysilicon allows its electrical conductivity to be varied, for instance increased. The distances that are shown between the structures can exist for an idle state, and can be decreased upon application of an external pressure p or in the event of an overload, for instance when pressure spikes occur. Spacing elements 3a advantageously allow contact between different potentials on first counter electrode E1 and first intermediate carrier ZT1, and a short circuit or welding of contact surfaces occurring in that context, to be prevented.

Spacing elements 3a can have a cross section that can have any shape, for instance circular, rectangular, triangular, semicircular, or combinations thereof, in plan view, e.g., viewed from first counter electrode E1. The side regions of spacing structures 3a can furthermore represent straight, vertical side walls or can exhibit an angle with respect to the surface of intermediate carrier ZT1. The location and number of spacing elements 3a under first intermediate carrier ZT1 can likewise be arbitrary, depending on the degree of protection desired against deflection, since with a large load, intermediate carrier ZT1 can also deflect between the spacing elements, and a dense disposition of spacing elements 3a can prevent contact with first counter electrode E1. In addition, spacing elements 3a can be present on first intermediate carrier ZT1 preferably in the region below contact points KS that connect first intermediate carrier ZT1 to membrane 3. It is thereby possible to prevent first intermediate carrier ZT1 from deflecting between spacing elements 3a under a large load (large external pressure p).

Figure 2:
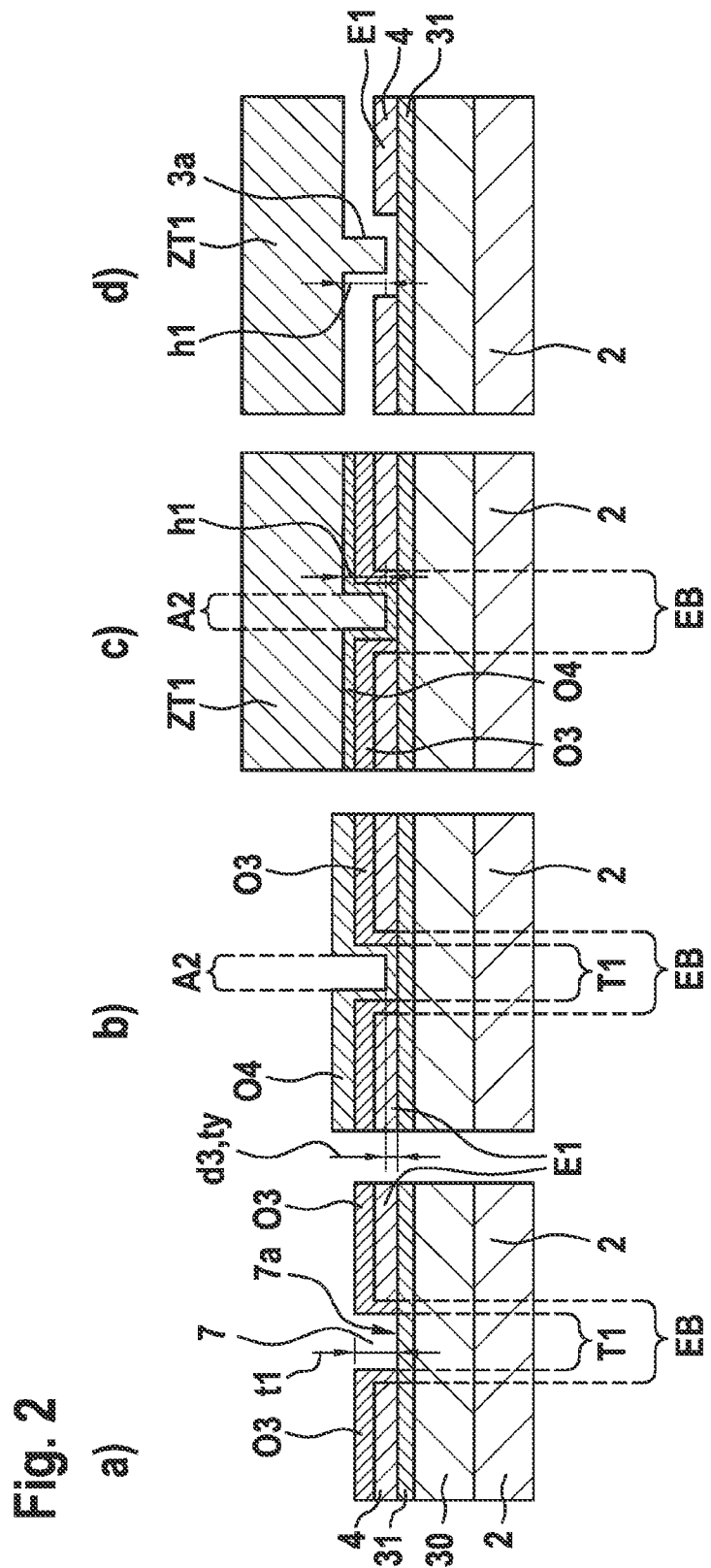
FIG. 2 is a schematic side view of a sensor device during a production method in accordance with an exemplifying embodiment of the present invention.

FIG. 2 is a schematic side view of a portion, in the region of a stop element 3a, of a sensor device during a production method in accordance with an exemplifying embodiment of the present invention.

In the method, spacing elements 3a can be configured above regions EB separated from first counter electrode E1 in such a way that spacing element 3a encompasses, for example, a material identical to that of first intermediate carrier ZT1. FIG. 2A shows a method step in which a first insulation layer 30 is disposed above substrate 2, an additional insulation layer 31 being capable of being disposed in turn on that layer. A first electrically conductive layer 4 can be disposed on the first or the additional insulation layer 30, 31 and can subsequently be patterned in order to generate separated regions EB in which first electrically conductive layer 4 can be removed as far as the first or additional insulation layer 30, 31, and a first recess 7 having a floor 7a can thus be constituted. First conductive layer 4 can furthermore be used to constitute first counter electrode E1. Before the disposition of first intermediate carrier ZT1, as shown in FIG. 2b a third sacrificial layer O3 can be deposited onto first counter electrode E1 and in the region of first recess 7 and can be removed again on floor 7a in a third sub-region T1 of first recess 7, so that edges of first counter electrode E1 remain covered by third sacrificial layer O3. First recess 7 can thus have a first depth t1 that can correspond to the total thickness of first conductive layer 4 and third sacrificial layer O3.

As shown in FIG. 2B, a fourth sacrificial layer O4, whose thickness ty can define a distance of spacing element 3a from a floor 7a of separated region EB, can be deposited onto third sacrificial layer O3 and in third sub-region T1. The disposition of a fourth sacrificial layer O4 results, within separated region EB, in a fourth sub-region A2 that can have a smaller lateral extent than third sub-region T1. The total thickness of third and fourth sacrificial layers O3, O4 outside separated region EB can define the first distance of first intermediate carrier ZT1 from first counter electrode E1. This distance can exist in the idle position of intermediate carrier ZT1, and can be decreased in the context of an elevated external pressure p. The third sacrificial layer O3 recited in this application instance can encompass a silicon oxide, as can fourth sacrificial layer O4.

As shown in FIG. 2C, first intermediate carrier ZT1 can be deposited on fourth sacrificial layer O4 and in fourth sub-region A2. Spacing element 3a is thereby formed. Spacing element 3a can have a first height h1 that is equal to total thickness t1 of first conductive layer 4 and third sacrificial layer O3, and can be at a distance from floor 7a which can correspond to layer thickness of fourth sacrificial layer O4. The width of spacing element 3a is advantageously less than the width of separated region EB. In addition, several spacing elements 3a can be configured identically to or differently from one another.

As shown in FIG. 2D, third sacrificial layer O3 and fourth sacrificial layer O4 can be removed between first counter electrode E1 and first intermediate carrier ZT1 via an etching process.

Figure 3:
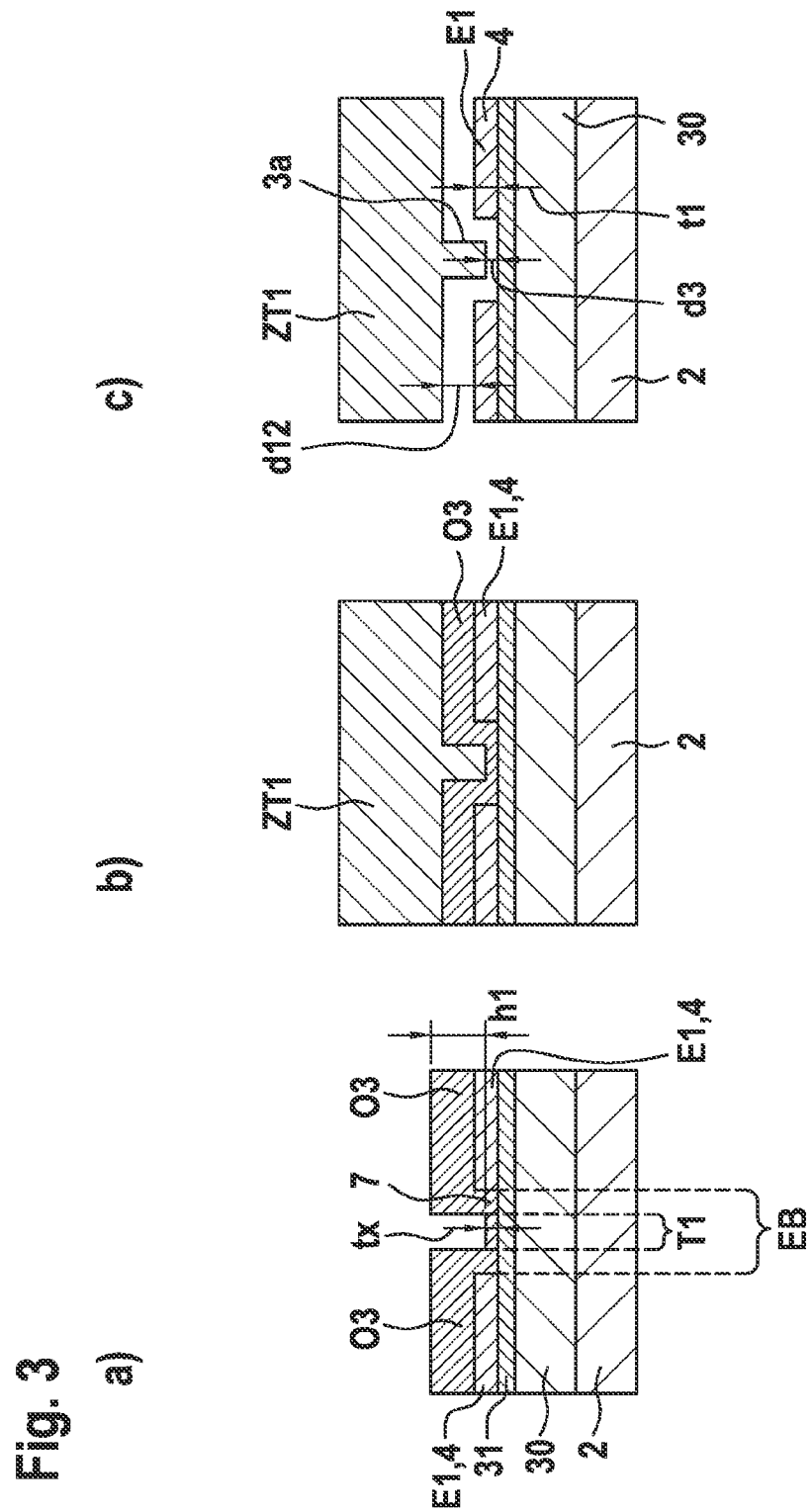
FIG. 3 is a schematic side view of a sensor device during a production method in accordance with a further exemplifying embodiment of the present invention.

FIG. 3 is a schematic side view of a sensor device during a production method in accordance with an exemplifying embodiment of the present invention.

FIGS. 3a to 3c show an alternative for the production of spacing elements 3a on an intermediate carrier ZT1, in which context only one sacrificial layer, in particular a third sacrificial layer O3, can be used. The method step in FIG. 3A is substantially the same as that in FIG. 2A, the only difference being that in third sub-region T1, third sacrificial layer O3 can be removed only to a specific depth without reaching floor 7a of first recess 7. The depth of the recess in third sacrificial layer O3 can correspond to first height h1 of spacing element 3a, and the remaining thickness of third sacrificial layer O3 in this region and above floor 7a of recess can correspond to a thickness tx. Advantageously, first height h1, i.e. the depth of the recess in third sacrificial layer O3, can be greater than the thickness of first electrically conductive layer 4 that is used to generate first counter electrode E1, so that in the event of an overload, i.e. if spacing element 3a sits on floor 7a of recess 7, spacing element 3a has a first height h1 that is greater than the depth of recess 7 in first counter electrode E1, i.e. h1 is greater than the thickness of counter electrode E1.

In the step in FIG. 3b, the material of first intermediate carrier ZT1 can be applied on third sacrificial layer O3 and in third sub-region T1, and in the step in FIG. 3c third sacrificial layer O3 can be removed, after which an open space can remain under first intermediate carrier ZT1, and a spacing element 3a can remain above first recess 7. Spacing element 3a can be at a distance d3 from the floor of recess 7a. This distance d3 can exist in an idle position of intermediate carrier ZT1, and can be decreased in the context of an elevated external pressure p.

Figure 4:
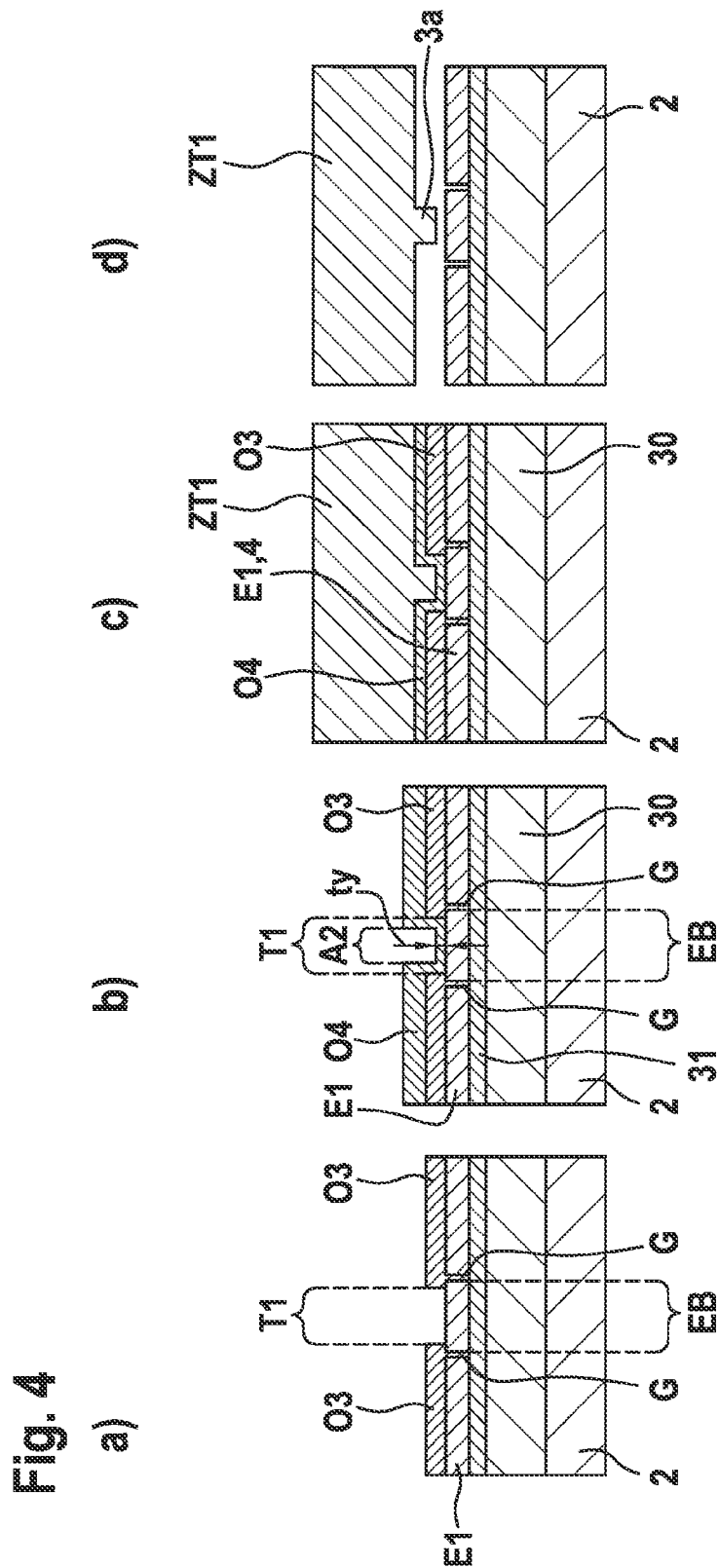
FIG. 4 is a schematic side view of a sensor device during a production method in accordance with a further exemplifying embodiment of the present invention.

FIG. 4 is a schematic side view of a sensor device during a production method in accordance with an exemplifying embodiment of the present invention.

FIGS. 4a to 4c show an alternative for producing spacing elements 3a on an intermediate carrier ZT1, in which the method step of FIG. 4A differs from that of FIG. 2A only in that first counter electrode E1, in particular first conductive layer 4, is patterned, and separated region EB can be configured by trenches G in electrically conductive layer 4 and can be electrically separated from the remaining region of first counter electrode E1, in which context the configuration of a large-area first recess 7 in first counter electrode E1 can be omitted. Third sacrificial layer O3 can then be applied on first counter electrode E1 and removed in a third sub-region T1 inside separated region EB, so that edges of a recess in third sacrificial layer O3 are produced, and outside that recess trenches G and counter electrode E1 can be covered by third sacrificial layer O3. FIG. 4B shows that a fourth sacrificial layer O4 can be applied on third sacrificial layer O3 and in its recess inside separated region EB; a recess, which can have a smaller lateral extent than third sub-region T1, can be configured in a fourth sub-region A2 in fourth sacrificial layer O4 in separated region EB. Fourth sacrificial layer O4 can cover the edges of third sacrificial layer O3 and can have a depth ty on floor 7a of the recess in third sacrificial layer O3.

In FIG. 4C, first intermediate carrier ZT1 can be applied onto fourth sacrificial layer O4, and in FIG. 4D sacrificial layers O3 and O4 can be removed again, which can result in a first intermediate carrier ZT1 having a spacing element 3a. The total thickness of third and fourth sacrificial layers O3, O4 defines a first distance of first intermediate carrier ZT1 from first counter electrode E1, which distance can be modified by application of an external pressure onto the membrane. Spacing elements 3a and separated regions EB can be at an identical potential as a result of corresponding interconnection, so that a short circuit is not generated when spacing elements 3a make contact with separated region EB.

Figure 5:
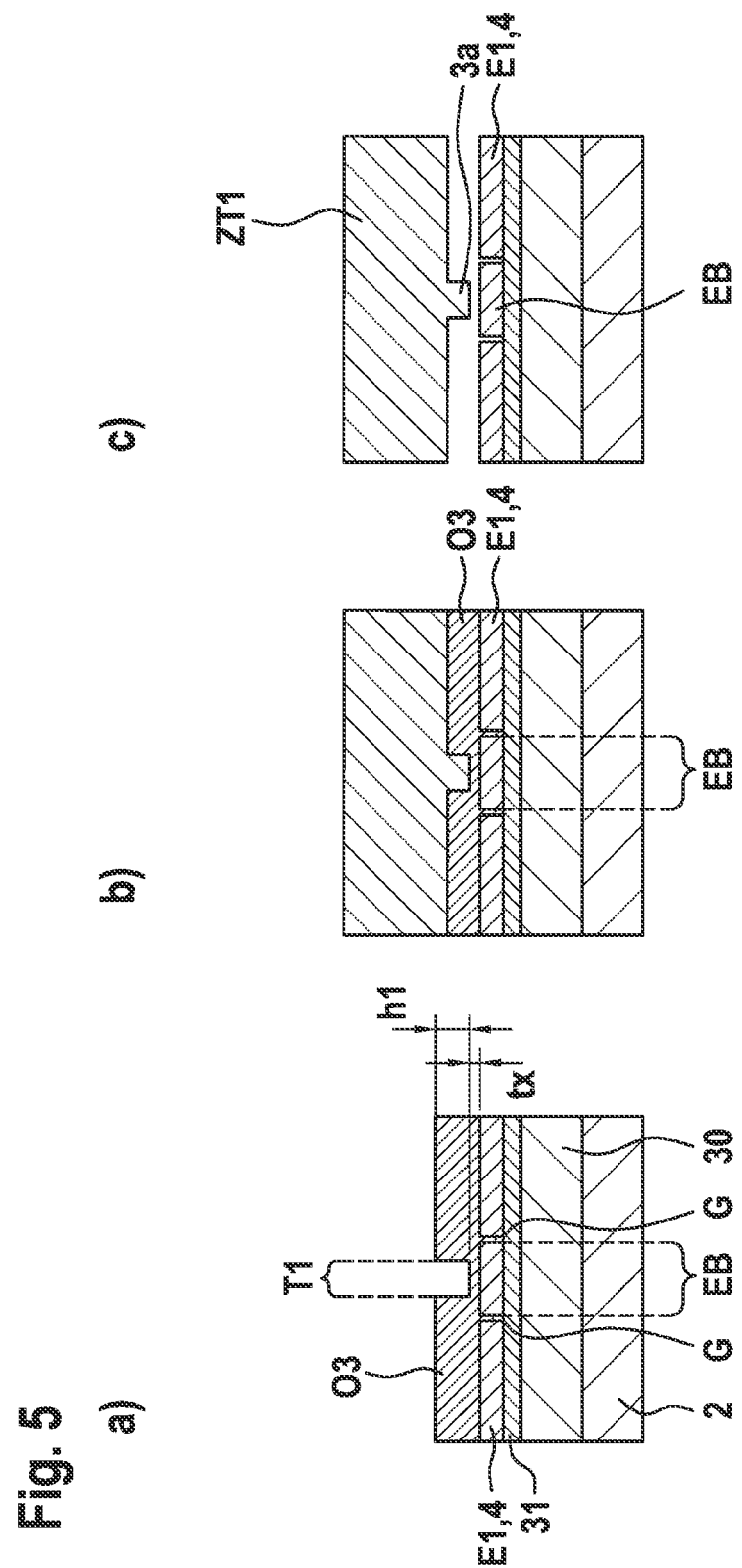
FIG. 5 is a schematic side view of a sensor device during a production method in accordance with a further exemplifying embodiment of the present invention.

FIG. 5 is a schematic side view of a sensor device during a production method in accordance with an exemplifying embodiment of the present invention.

FIGS. 5a to 5c show an alternative for producing spacing elements 3a on an intermediate carrier ZT1, in which context the step in FIG. 5A can differ from FIG. 4A only in that in the recess (in third sub-region T1) in third sacrificial layer O3, there remains inside separated region EB, which is electrically separated from first counter electrode E1 by trenches G in electrically conductive layer 4, a residual thickness tx of third residual layer O3 which can already correspond to the intended distance of spacing element 3a from first conductive layer 4. In this case, deposition of a fourth sacrificial layer can be omitted. The depth of the recess in third sacrificial layer O3 in third sub-region T1 can correspond to first height h1 of spacing element 3a that is subsequently configured in FIG. 5B. In FIG. 5b, first intermediate carrier ZT1 can be applied onto third sacrificial layer O3, and in FIG. 5c sacrificial layers O3 can be removed again; this can result in a first intermediate carrier ZT1 having a spacing element 3a.

In all the variants shown in FIGS. 1 to 5, it is furthermore possible, by appropriately selecting the ratio between first height h1 of spacing element 3a and remaining thickness tx of sacrificial layer O3 or thickness ty of sacrificial layer O4 within third sub-region T1, to allow a defined first distance d12 between a first intermediate carrier ZT1 and a first counter electrode E1 to be established in the event of contact between spacing element 3a and floor 7a. Height h1 of spacing element 3a corresponds here to the sum of the layer thickness of a third sacrificial layer O3 and the layer thickness of a fourth sacrificial layer thickness O4. Because the movable electrode, in this case first intermediate carrier ZT1, can come very close to the stationary counter electrode E1 in the event of contact between spacing element 3a and floor 7a, there occurs in the context of a capacitive measurement, as the distance between the electrodes decreases, an additional force component that is caused by the applied measurement voltage and tries to pull the electrodes toward one another. In order to allow this to be avoided, it is advantageous if, in the event of contact or overload caused, for instance, by a high external pressure p, intermediate carrier ZT1 can be held at a defined distance d12 with respect to counter electrode E1.

The sensor device can encompass a pressure sensor, or further types of pressure sensors, MEMS microphones, inertial sensors, or the like, in which an effort can be made to prevent two surfaces having different potentials from being able to touch.

Figure 6:
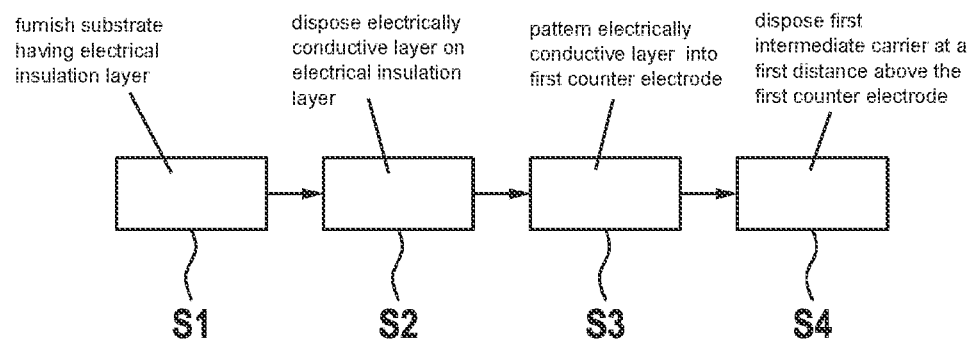
FIG. 6 schematically depicts method steps of a method for producing a sensor device in accordance with an exemplifying embodiment of the present invention.

FIG. 6 schematically depicts method steps of a method for producing a sensor device in accordance with an exemplifying embodiment of the present invention.

In the method for producing a sensor device in accordance with an example embodiment of the present invention: a substrate having at least one electrical insulation layer is furnished S1, and an electrically conductive layer is disposed S2 on the electrical insulation layer on the substrate; the electrically conductive layer is patterned S3 into a first counter electrode in an internal region and the first counter electrode is patterned, at least one region electrically separated from the first counter electrode being configured; a first intermediate carrier is disposed S4 at a first distance above the first counter electrode using at least one spacing element that extends from the intermediate carrier toward the substrate, so that the spacing element is located above the separated region and is spaced apart from it; an edge structure being configured on the at least one electrical insulation layer and a membrane being anchored on the edge structure and at least partly spanning the internal region; the membrane encompassing in the internal region a region movable by way of a pressure; and the intermediate carrier extending in the movable region below the membrane and being electrically and mechanically connected to the membrane by contact points; and the spacing element having a lateral extent that is less than or equal to the extent of the separated region.

Although the present invention has been entirely described in the present instance with reference to the preferred exemplifying embodiment, it is not limited thereto but is instead modifiable in many ways.

What is claimed is:

1. A sensor device, comprising:
 a substrate;
 at least one electrical insulation layer on the substrate;
 an edge structure that is disposed on the at least one electrical insulation layer and delimits an internal region above the substrate;
 a membrane that is anchored on the edge structure and at least partly spans the internal region, the membrane encompassing, in the internal region, a region movable by a pressure;
 a first intermediate carrier that extends in the movable region below the membrane and is electrically and mechanically connected to the membrane by contact points, the membrane being able to be stiffened by the first intermediate carrier, and the first intermediate carrier representing a movable electrode, and encompasses at least one spacing element that extends from the intermediate carrier toward the substrate in a region below the contact points; and
 a first counter electrode on the at least one electrical insulation layer,
 the first counter electrode extending under the intermediate carrier, and a first distance between the intermediate carrier and the first counter electrode being modifiable by the pressure on the movable region, and the first counter electrode encompassing, under the intermediate carrier, at least one electrically separated region that is disposed below the spacing element and has at least a lateral extent of the spacing element.

2. The sensor device as recited in claim 1, wherein the first counter electrode encompasses in the separated region at least one recess having a floor, in which the electrical insulation layer is exposed and which is electrically insulated from the first counter electrode, the recess being located below the spacing element and extending, in plan view, laterally beyond the spacing element in all directions.

3. The sensor device as recited in claim 1, wherein the spacing element encompasses a material identical to that of the intermediate carrier.

4. The sensor device as recited in claim 2, wherein the spacing element has a first height that is greater than a thickness of the first counter electrode.

5. The sensor device as recited in claim 1, wherein the region electrically separated from the first counter electrode, and the first counter electrode, encompass one identical material, and an electrical potential present at the electrically separated region is the same as that at the first intermediate carrier.

6. The sensor device as recited in claim 1, wherein the spacing element has a first height that is less than a thickness of the first counter electrode.

7. The sensor device as recited in claim 1, wherein the spacing element has a first height that is less than the first distance in an idle position of the intermediate carrier.

8. A sensor device comprising:
 a substrate;
 an electrical insulation layer on the substrate;
 an electrically conductive layer on the electrical insulation layer;
 a first counter electrode patterned from the electrically conductive layer in an internal region in which there is a region that is electrically separated from the first counter electrode;
 a first intermediate carrier that forms a movable electrode;
 a spacing element:
  that extends away from the first intermediate carrier towards the substrate so that the spacing element is located above the separated region;
  that is spaced away from the separated region;
  that has a lateral extension that is less than or equal to an extension of the separated region; and
  by which the first intermediate carrier is arranged at a first distance above the first counter electrode;

an edge structure configured on the electrical insulation layer; and a membrane that:
- is anchored on the edge structure;
- at least partly spans the internal region; and
- encompasses in the internal region a region movable by a pressure;

wherein the first intermediate carrier extends in the movable region below the membrane, is electrically and mechanically connected to the membrane by contact points, and stiffens the membrane, wherein the spacing element extends away from the first intermediate carrier towards the substrate in a region below the contact points.

9. The sensor device as recited in claim 8, wherein the electrically separated region includes a first recess formed by removal of material of the first counter electrode that occurs by a patterning of the first counter electrode.

10. The method as recited in claim 9, wherein, before disposition of the first intermediate carrier, a first sacrificial layer (a) is disposed on the first counter electrode and on the first recess and (b) is subsequently removed in a first sub-region of the first recess in a manner by which edges of the first counter electrode in the first recess remain covered by the first sacrificial layer.

11. The method as recited in claim 10, wherein, before the disposition of the first intermediate carrier:
- a second sacrificial layer is disposed onto the first sacrificial layer and also in the first sub-region where the first sacrificial layer has been removed; and
- in a second sub-region, which is inside the first sub-region, a recess is configured which has a smaller lateral extent than the first sub-region, a remaining thickness of the second sacrificial layer defining, in the recess, a distance of the spacing element from a floor of the electrically separated region.

12. The method as recited in claim 9, wherein, before disposition of the first intermediate carrier, a first sacrificial layer (a) is disposed on the first counter electrode and on the electrically separated region and (b) is subsequently removed again in a first sub-region of the electrically separated region, which has a smaller lateral extent than the electrically separated region.

13. The method as recited in claim 12, wherein, before the disposition of the first intermediate carrier:
- a second sacrificial layer is disposed onto the first sacrificial layer and also in the first sub-region where the first sacrificial layer has been removed; and
- in a second sub-region, which is inside the first sub-region, a recess is configured which has a smaller lateral extent than the first sub-region, a remaining thickness of the second sacrificial layer defining, in the recess, a distance of the spacing element from a surface of the electrically separated region.

14. The method as recited in claim 13, wherein the second sacrificial layer or the first sacrificial layer is partly or completely removed inside the first and/or second sub-region by an etching operation.

15. The method as recited in claim 8, wherein the electrically conductive layer is patterned in such a way that the separated region is configured by way of a trench in the electrically conductive layer, and is separated from a remaining region of the first counter electrode.

* * * * *